United States Patent [19]

Mc Govern

[11] Patent Number: 5,662,187
[45] Date of Patent: Sep. 2, 1997

[54] ELECTRICALLY ASSISTED PEDALLED BICYCLE

[76] Inventor: James Robert Mc Govern, 205 E. 239th St., Bronx, N.Y. 10470

[21] Appl. No.: 508,220

[22] Filed: Jul. 27, 1995

[51] Int. Cl.⁶ .................................................. B62M 7/12
[52] U.S. Cl. .................... 180/205; 180/220; 180/65.2; 180/65.5
[58] Field of Search ................... 180/220, 65.1, 180/65.2, 65.5, 65.8, 205, 206, 207; 310/67 A, 68 A

[56] References Cited

U.S. PATENT DOCUMENTS

| | | | |
|---|---|---|---|
| 3,991,843 | 11/1976 | Davidson | 180/220 X |
| 4,221,275 | 9/1980 | Pennebaker et al. | 180/220 X |
| 5,272,938 | 12/1993 | Hau et al. | 180/220 X |
| 5,368,122 | 11/1994 | Chou | 180/205 X |
| 5,433,284 | 7/1995 | Chou | 180/205 |
| 5,450,915 | 9/1995 | Li | 180/220 X |
| 5,474,150 | 12/1995 | Mabuchi | 180/220 |

FOREIGN PATENT DOCUMENTS

| | | | |
|---|---|---|---|
| 54264 | 1/1938 | Denmark | 180/220 |
| 46447 | 3/1939 | Netherlands | 180/220 |
| 703942 | 2/1954 | United Kingdom | 180/220 |

*Primary Examiner*—Victor E. Johnson

[57] ABSTRACT

An electrically assisted pedalled bicycle that has a rear wheel mounted on a frame supported elongated axle, a modified freewheel that has an electric motor's brushes, frame, and field coil windings supported to its body, a commutator and armature that are stationarily fastened to the stationary axle, a battery that is controlled by a manually operable rheostat, and an electric circuit that includes a chain actuated on/off switch, so that when the rheostat is advanced, and the chain is actuated, the circuit goes on, and the rider's pedalling provides pedal torque to the freewheel sprocket, and while the bicycle is commencing to be propelled, the motor's brushes and field are rotated about and interact with the motor's commutator and armature and simultaneously provide a motor torque that is blended with the rider's pedal torque as it flows to the freewheel sprocket, to thereby assist the rider's pedalling as it propels the bicycle.

5 Claims, 8 Drawing Sheets

ELECTRICALLY ASSISTED PEDALLED BICYCLE

BACKGROUND OF THE INVENTION

This invention relates to the field of devices that have been invented to assist a rider's pedalling effort to propel a bicycle. Specifically it relates to electric motor assisted bicycle propulsion. The prior art in this field has provided devices that directly engage a bicycle's chain or one of its wheels to assist in propelling the bicycle.

This prior art method of direct engagement of the chain or a wheel by a motor usually has resulted in creating a noticeable jolt to the rider each time the device is applied in the propulsion process.

SUMMARY OF THE INVENTION

It is therefore a primary object of this invention to provide apparatus that will smoothly combine torque from multiple sources.

Another object is to provide a single receptor, that is the rear wheel hub of a bicycle wheel, of the applied torque of multiple propelling forces Another object is to provide apparatus that is capable of applying torque from multiple sources to the rear wheel hub of a bicycle wheel simultaneously.

Another object is to provide a motorized torque source that is measurably controllable.

And another object of the invention is to provide a smooth blend of mechanical, propelling torque, and electrical, motor torque, so that there is no noticeable lead or lag between the two torques.

Other objects of the invention will become apparent as the description thereof progresses.

In order to accomplish the above and related objects of the invention, its embodied form could be produced by one's reference to the accompanying drawings, keeping in mind that changes could be made in the actual construction as it is shown and described within the scope of the appended claim.

DESCRIPTION OF THE DRAWINGS

FIG. 4 is section 4—4 of FIG. 3. Section 4—4 shows a frontal elevation of the motor brush support and the motor's field supporting base plate in their attachment to the bicycle's freewheel body.

FIG. 5 is section 5—5 of FIG. 3. Section 5—5 shows a frontal elevation of the axle mounted current access disk, a disk contact ring, and the shoes that carry the contacts that facilitate current access to rotational motor elements.

FIG. 6 is section 6—6 of FIG. 3. Section 6—6 shows a frontal elevation of the motor's brushes engaging the motor's commutator, and the field enclosed armature of the motor.

2

DETAILED DESCRIPTION

Figure 1:
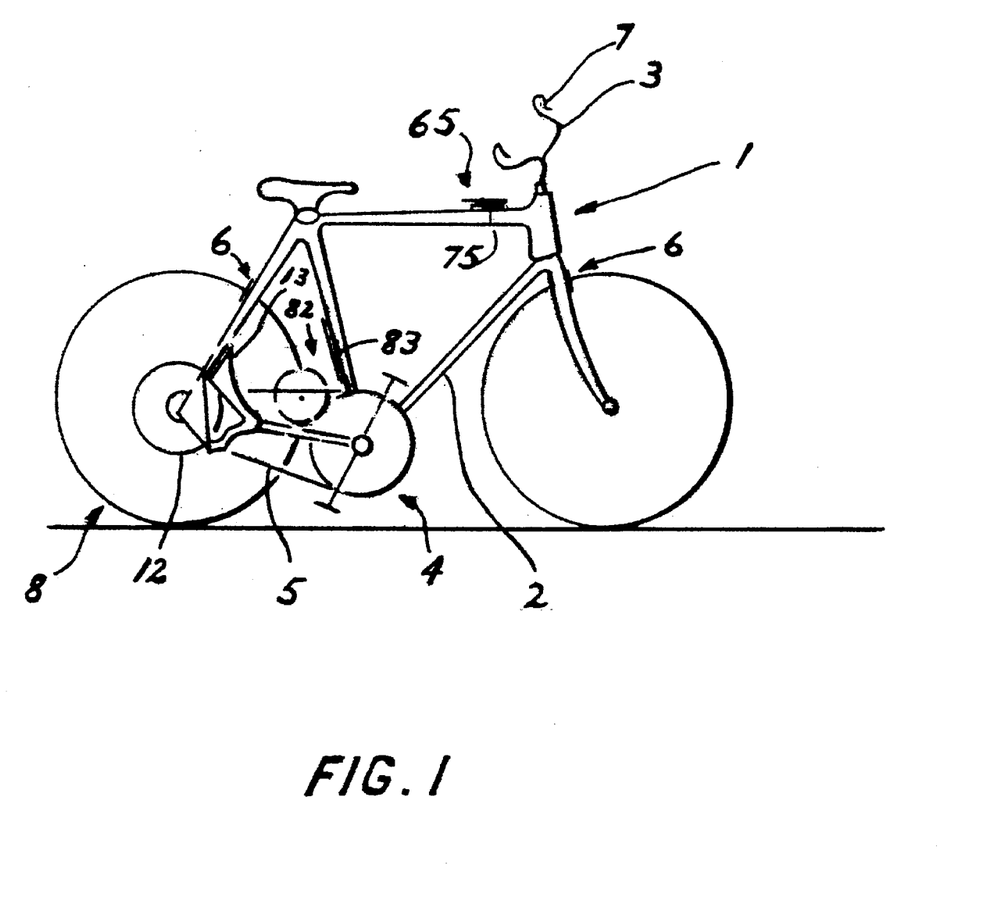
FIG. 1 is a conceptual view of an electric motor assisted pedalled bicycle.

With reference to FIG. 1, provide a bicycle 1 frame 2 with 26" wheels and with standard peripherals such as a seat, handlebars 3, main sprocket with pedal crank 4, and pedals, a chain 5, and caliper type brakes 6 that can be actuated by handlebar mounted hand levers 7. FIG. 1 also shows provision for elements of the invention's electrical circuit, including the motor 12, the current controller rheostat 65, and a chain 5 actuated on/off switch 82. If a commercially available electromagnetic switch 82 could be made adaptable here, it could be used.

Figure 2:
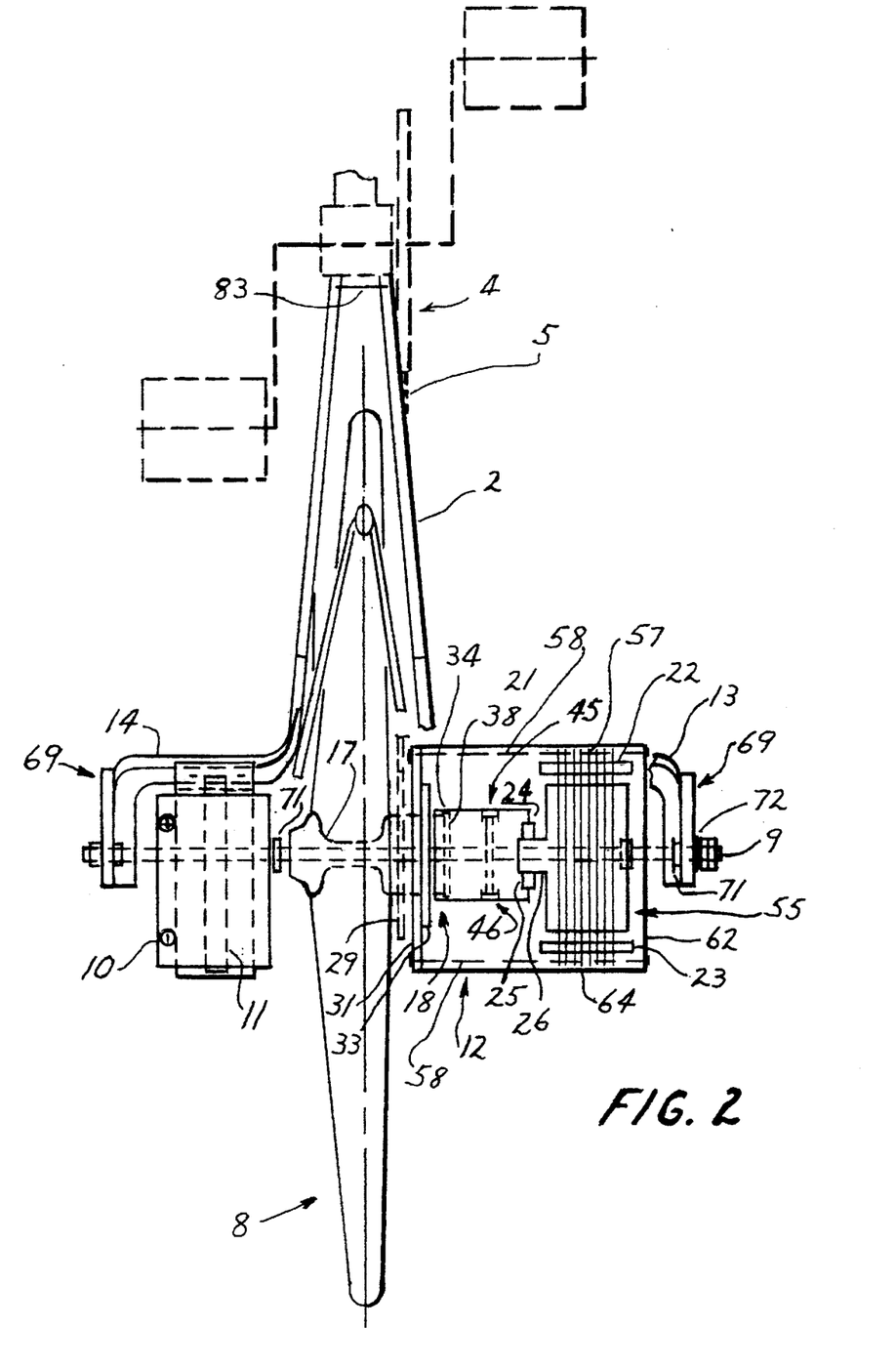
FIG. 2 is a pictorial top view of a bicycle rear wheel that shows the battery, wheel, freewheel, and motor configuration of the invention.

Now with reference to FIG. 1 and FIG. 2, provide the rear wheel 8 of the bicycle 1 with an elongated axle 9 that will carry a battery 10, a wheel 8, and a motor 12, and support them to the frame 2 of the bicycle 1 by two brackets, 13 and 14.

Figure 3:
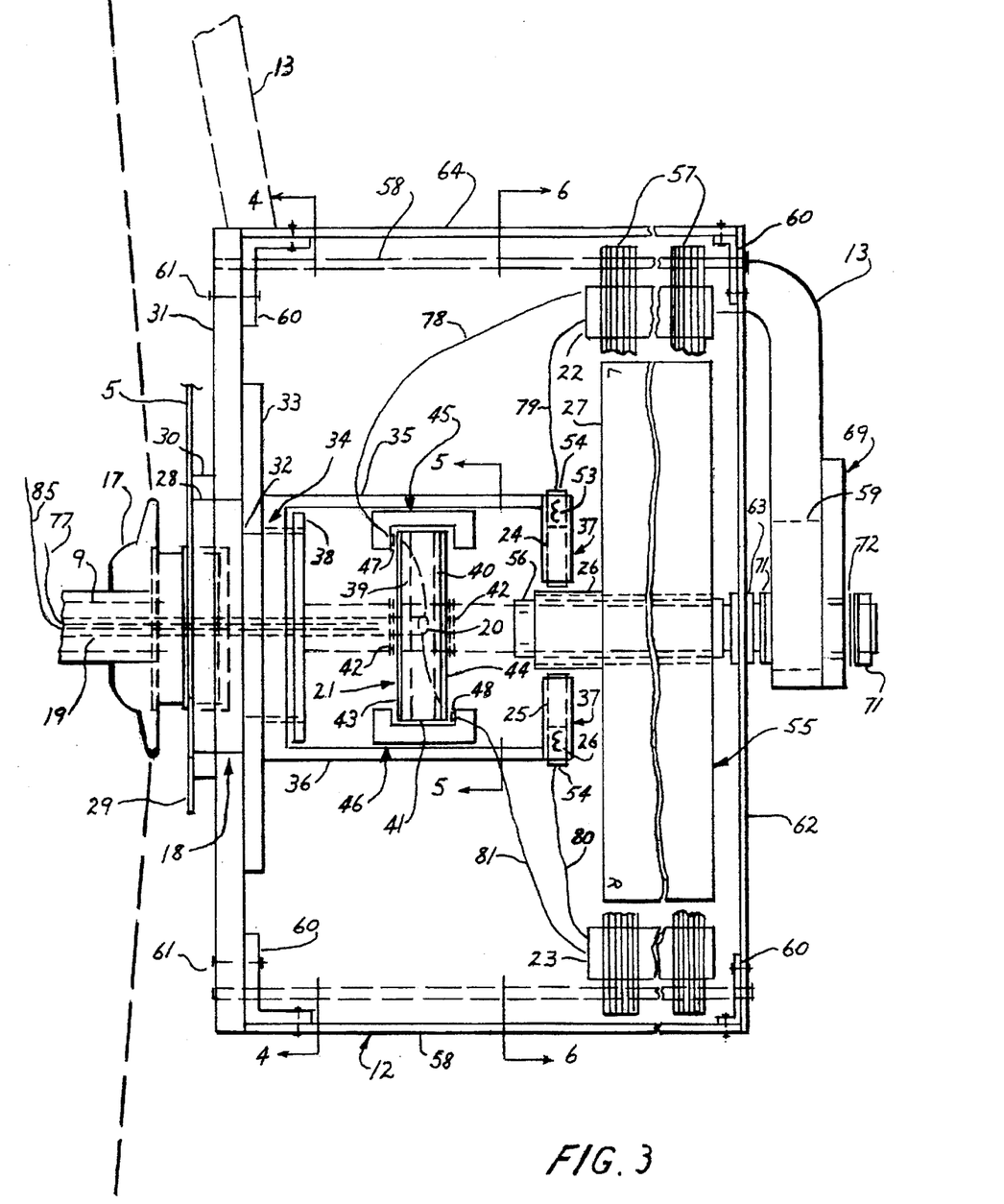
FIG. 3 is a pictorial top view of a bicycle rear wheel hub, showing in actual size and in greater detail, the attachment of a motor's elements to the bicycle's freewheel body, and to the axle of the wheel.
Figure 3A:
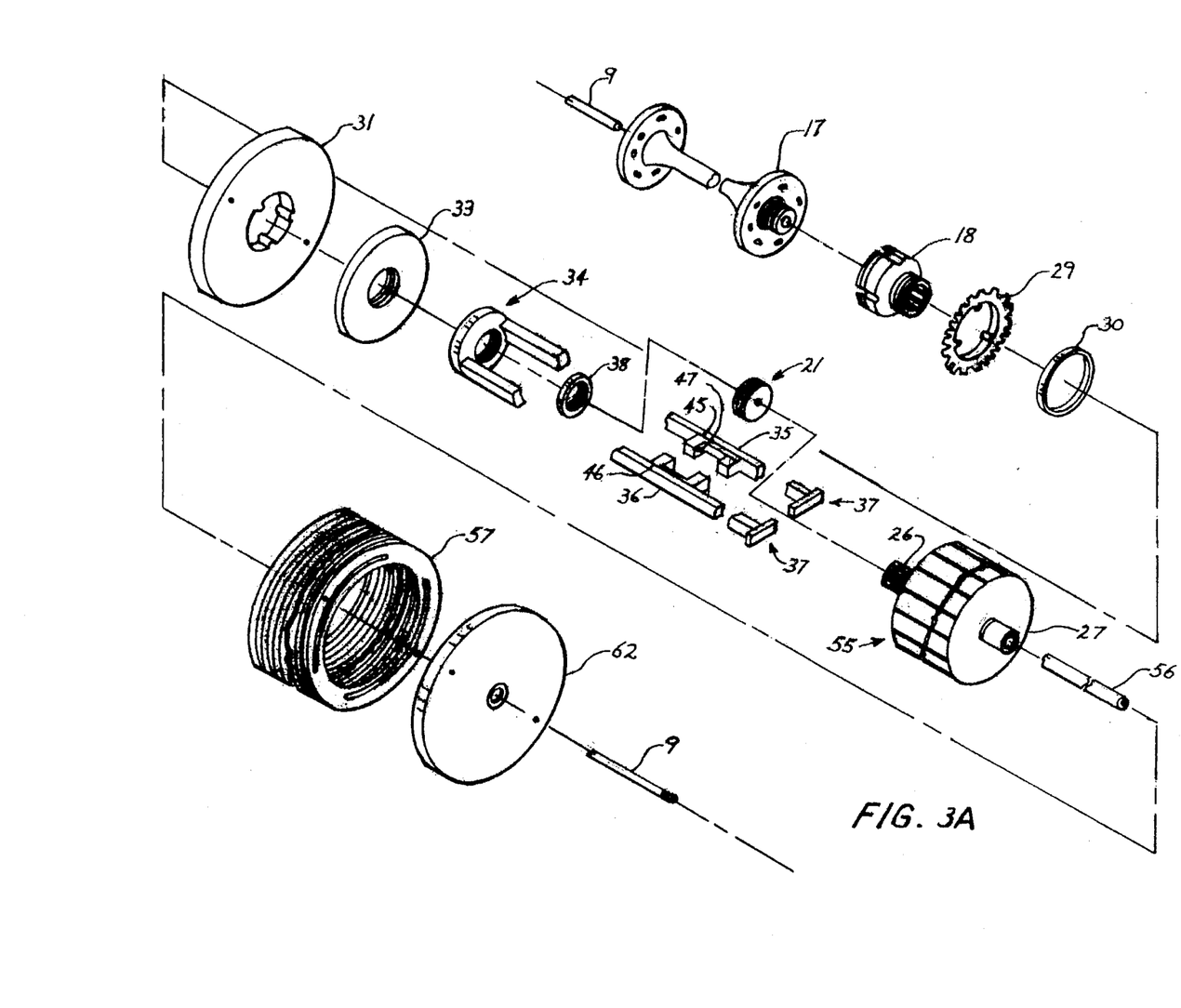
FIG. 3A is an exploded view that shows the motor elements identified in FIG. 3, in perspective.

With reference to FIG. 3, note that in this drawing the armature is marked L and R. These marks are to identify the left and right sides of the motor. Continuing, provide the rear wheel hub 17 of the bicycle 1 with a modified freewheel body 18. As shown in this drawing, some elements of the motor 12 are attached to and carried by the freewheel body 18.

Continuing with reference to FIG. 3, provide battery current to the motor 12 by providing wiring from the battery 10 through an elongated hole 19 that extends part way through the center lengthwise dimension of the axle 9, and through a vertical wire access hole 20 that extends from the end of the elongated hole, through the outside dimension of the axle 9, to a current access disk 21 that is connected in a stationary fastening to the axle 9. Current is bridged from the disk 21 to the motor fields, 22 and 23, and then to the motor's brushes 24 and 25. The brushes, 24 and 25, provide circuit to the motor's commutator 26 and armature 27.

Figure 4:
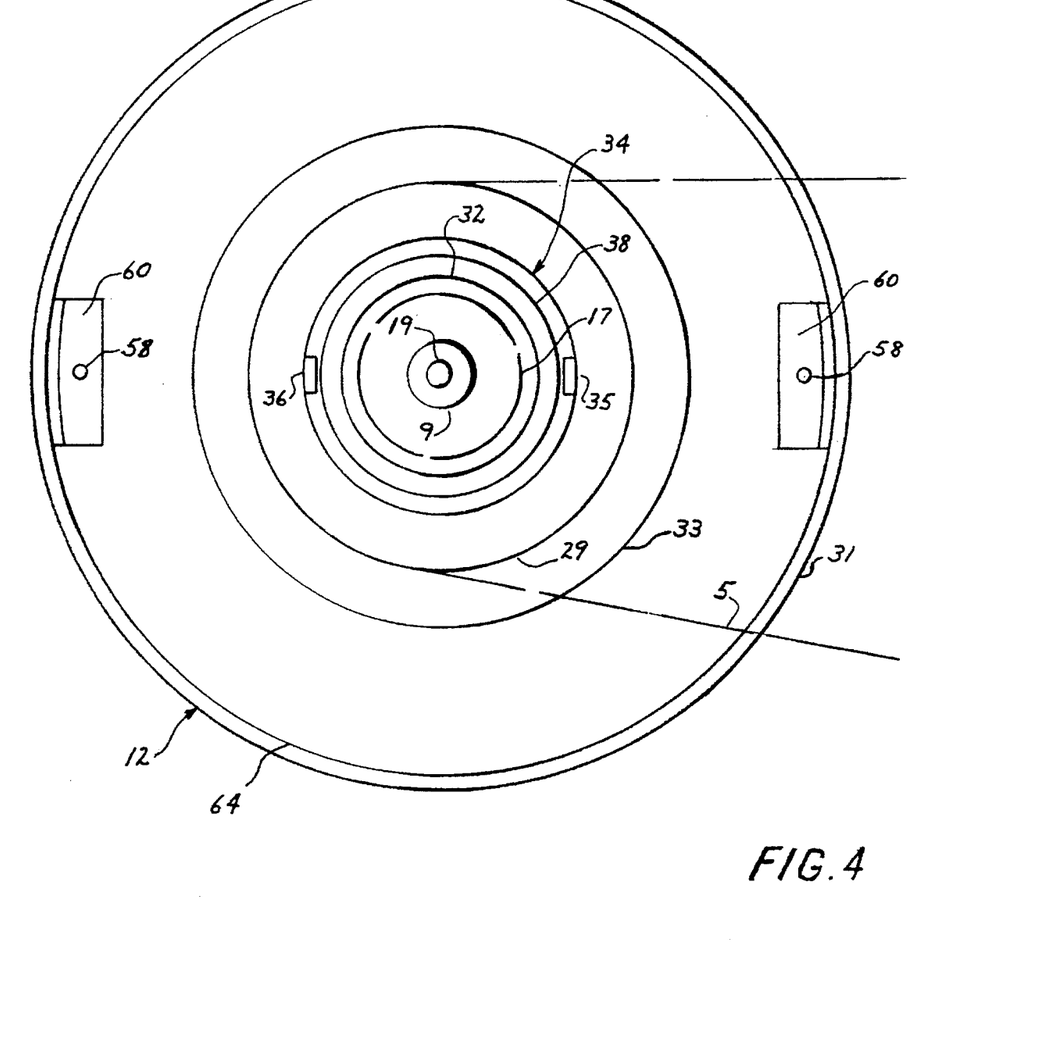

Now referring to FIG. 3, and FIG. 4 which is section 4—4 of FIG. 3, note that a typical slotted freewheel body is modified by the attachment of specially designed motor elements to its body. The freewheel body 18 is screwed onto the rear wheel hub 17. The hub is supported to the axle 9 typically by ball bearings and cone nuts, which are not shown. The body's grooved larger diameter surface 28 carries a nominal size, approximately 3¼" diameter, sprocket 29. The sprocket's 29 lugs are seated in the slots of the body 28. The sprocket 29 is flush against the body's 28 wheel side lip. A sprocket stabilizing spacer ring 30 is then placed on the body's grooved larger diameter 28. Approximately ¼" of the body's 28 grooved larger diameter surface remains. On this ¼" of the body's grooved larger diameter surface 28, provide a ¼" thick base plate 31 This plate 31 could be made of aluminum.

The balance of the body 32 is of a smaller diameter, about 1¹¹⁄₁₆" and is threaded. Here provide a ring 33 about 4¼" outer diameter, with a threaded center hole, and screw it onto the smaller diameter end of the body 32. This ring is to provide stability to the base plate 31. Now provide a brush arm support ring 34 that is approximately 2¼" outer diameter, with a threaded center hole, and that has two arm like extensions projecting perpindicularly from the outer diameter of the ring 34, and screw it onto the threaded smaller diameter end of the body 32. At the end of each arm projection provide a squared tube brush holder 37 disposed projecting at a right angle to the arm that it is attached to and pointing towards a line that would pass through the center of the brush arm ring 34.

Finally, provide a brush arm stabilizing ring 38 about 2" outer diameter, with a threaded center hole, and screw it onto the remaining surface of the threaded smaller diameter, end of the body 32. This stabilizer ring 38 is to retain and stabilize the brush arm ring 34. It should be noted here that the base plate 31 is the primary supporting base of motor elements that include, the motor frame 57, the field coils 22 and 23, the motor back plate 62, and the motor cover 64.

Figure 5:
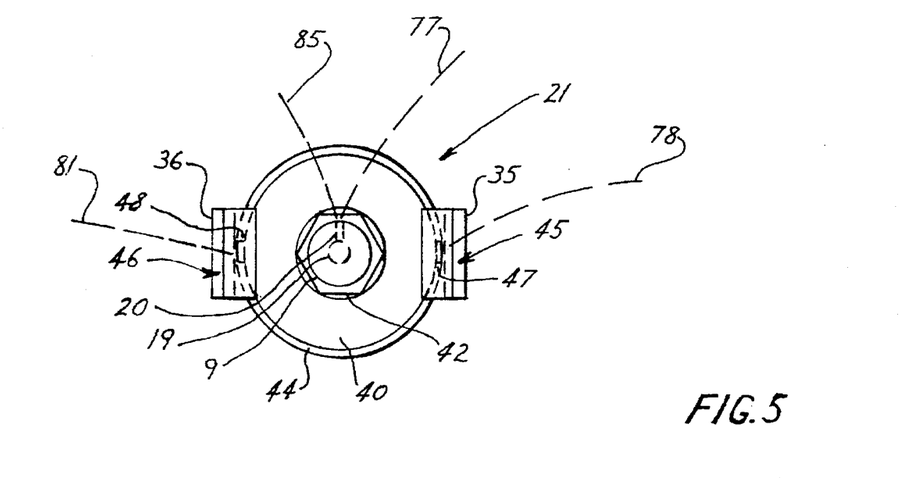

Now referring to FIG. 3, and FIG. 5 which is section 5—5 of FIG. 3, note how the invention's electrical wiring is accessed from the battery 10 to motor brush 24 and motor brush 25. Spaced along the axle 9 away from the brush arm stabilizer ring 38, provide a current access disk 21 that is comprised of two disks, 39 and 40 that are joined at their outer circumference by a spacer ring 41. The disk 21 is fastened on the axle 9 by lock nuts and washers 42. On the outer surface of each of the component disks, 39 and 40, attach a contact ring, a very thin metal ring surface 43, to component 39 and 44 to component 40. Provide as indicated above an elongated hole 19 through the center of the axle 9, extending from the battery end of the axle 9 to a point that coinsides with the space between component disks 39 and 40. At the end if the hole 19 provide as indicated above, a small hole 20 on the top side of the axle 9, extending from the end of the elongated hole to the outer surface of the axle 9. The hole 20 is an exit for the circuit wires that pass through the axle 9. On each arm of the brush arm ring 34, attach a contact shoe with set screws. Attach shoe 45 to arm 35 and shoe 46 to arm 36.

Figure 6:
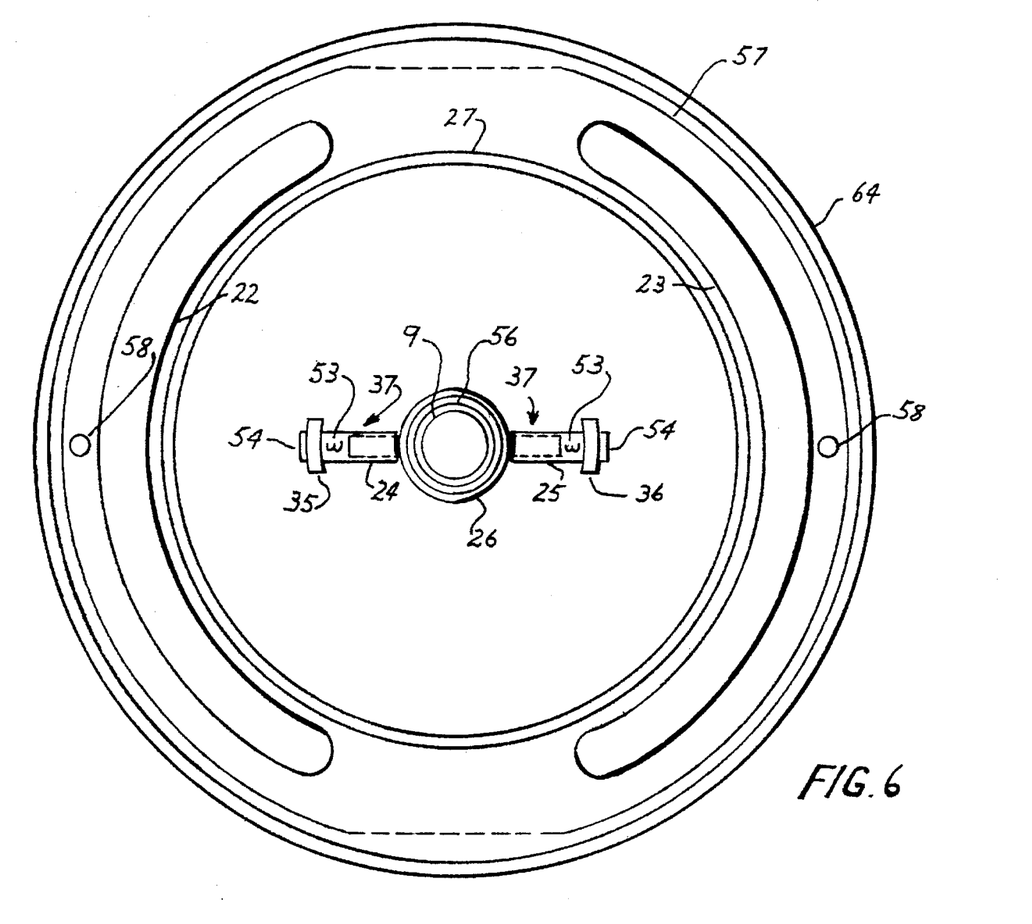

Each shoe carries a contact that brushes on and makes circuit with a contact ring. Shoe 45 carries contact 47 and shoe 46 carries contact 48 Contact 47 makes circuit with contact ring 43 and contact 48 makes circuit with contact ring 44 as the brush arm ring 34 is rotated as an extension of the freewheel body 18. Continuing to refer to FIG. 3, and also referring to FIG. 6 which is section 6—6 of FIG. 3, note the provision for motor brush 24 and motor brush 25, how each brush is carried by a holder 37 and each brush is provided with a tension spring 53, and a holder cap. One holder 37 carries carbon brush 24 and the other holder 37 carries carbon brush 25. Each brush is supported to contact with the motor commutator 26. The commutator 26 and armature 27, referred to above, are assembled as a unit 55 on a sleeve 56. The sleeve 56 is fastened to the axle 9 by set screws to provide a stationary commutator and armature unit 55.

A typical laminated motor frame 57 is supported to the motor base plate 31 and to the circular motor back plate 62 by support bolts and nuts. The motor field coils 22 and 23 are carried by the motor frame 57. The back plate 62 is supported to the axle 9 on a brass flanged bearing 63 that is fastened in the center of the plate 62. In FIG. 3 note that a motor enclosing cover 64 is supported to the base plate 31 and to the back plate 62 by bolted angle brackets 60.

Figures 7, 8, 9:
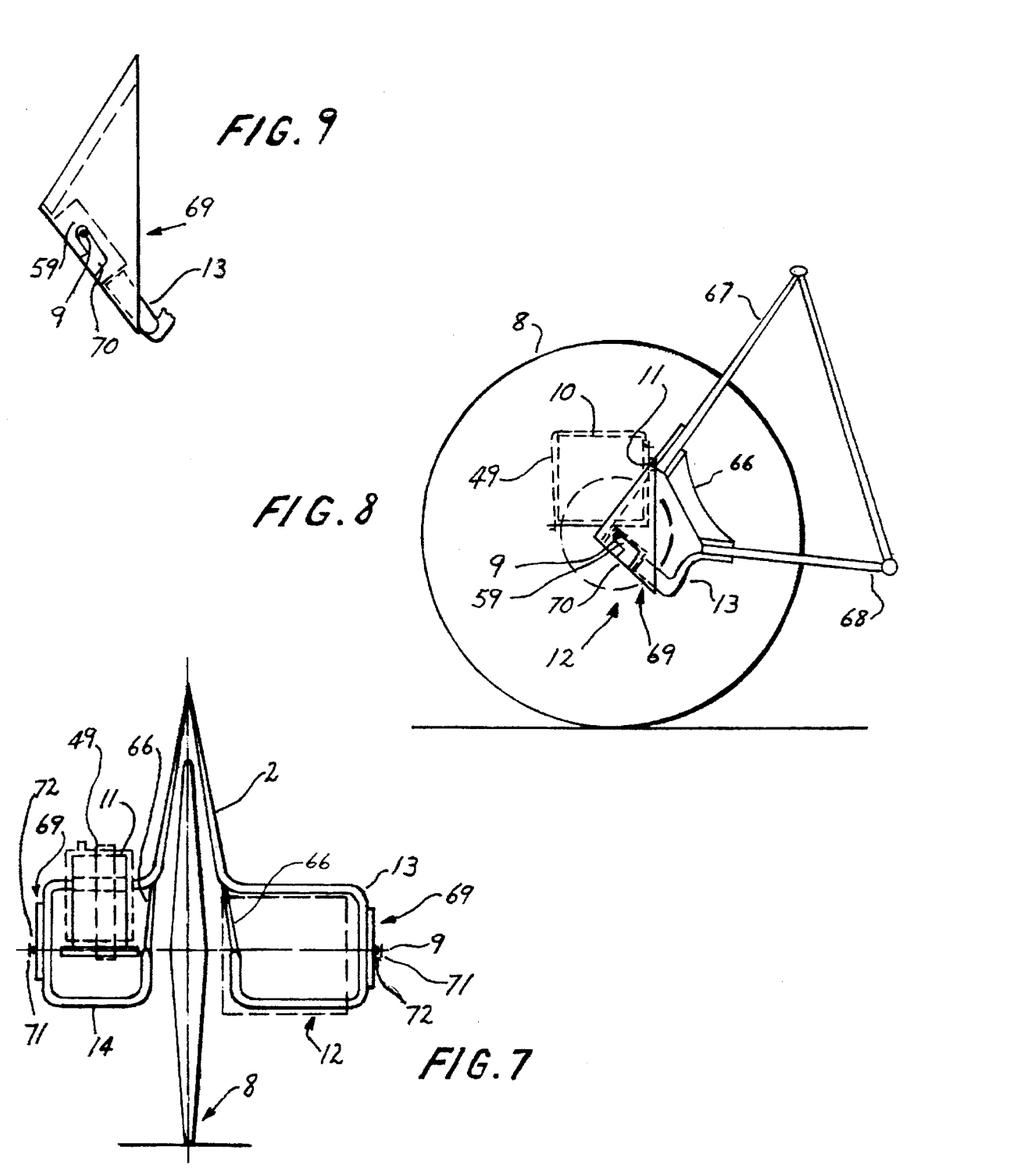
FIG. 7 is a rear elevation of a bicycle rear wheel that shows the wheel supporting elongated axle supported by special brackets and gussets, to the frame of the bicycle.
FIG. 8 is a side elevation of a bicycle rear wheel that shows the wheel supported to the bicycle frame.
FIG. 9 is a pattern drawing of the wheel axle-bracket-complementing gusset plate.

Referring now to FIG. 7, FIG. 8, and FIG. 9, note in greater detail, in a rear elevation and in a side elevation of the bicycle's rear wheel 8, how the wheel is supported to the bicycle frame 2, by brackets 13 and 14. These brackets could be made of tubular aluminum. Note, on each side of the wheel 8, a reinforcing support rib 66 joins the bracket ends where they are attached to the near vertical frame member 67, and the horizontal frame member 68. The bracket ends could be bolted to the frame members.

The trailing ends of bracket 13 and 14 are joined and reinforced by a gusset plate 69 on each side of the wheel 8. Each gusset 69 has a straight sided slot 70 cut into its trailing edge. The axle 9, which is partially squared at its ends, is made stationary by the containment of its ends by the slots of the gusset plates 69. (FIG. 9)

The axle is further stabilized at each end by an axle mounted spacer piece 59 that corresponds in length to the gap between the gusset joined bracket ends, and by washer 72 and lock nut 71, as shown in FIG. 3. Also in referring to FIG. 7 and FIG. 8, note that the battery 10 is carried in a holder 11 that is supported to the axle and frame bracket 14. On the bottom surface of the holder 11, a channel is provided to contain the axle 9, and on the vertical outer vace of the holder a channel is provided to contain a horizontal segment of bracket 14. The battery 10 is stabilized by a wrap around strap 49 with a velcro fastener.

Figure 10:
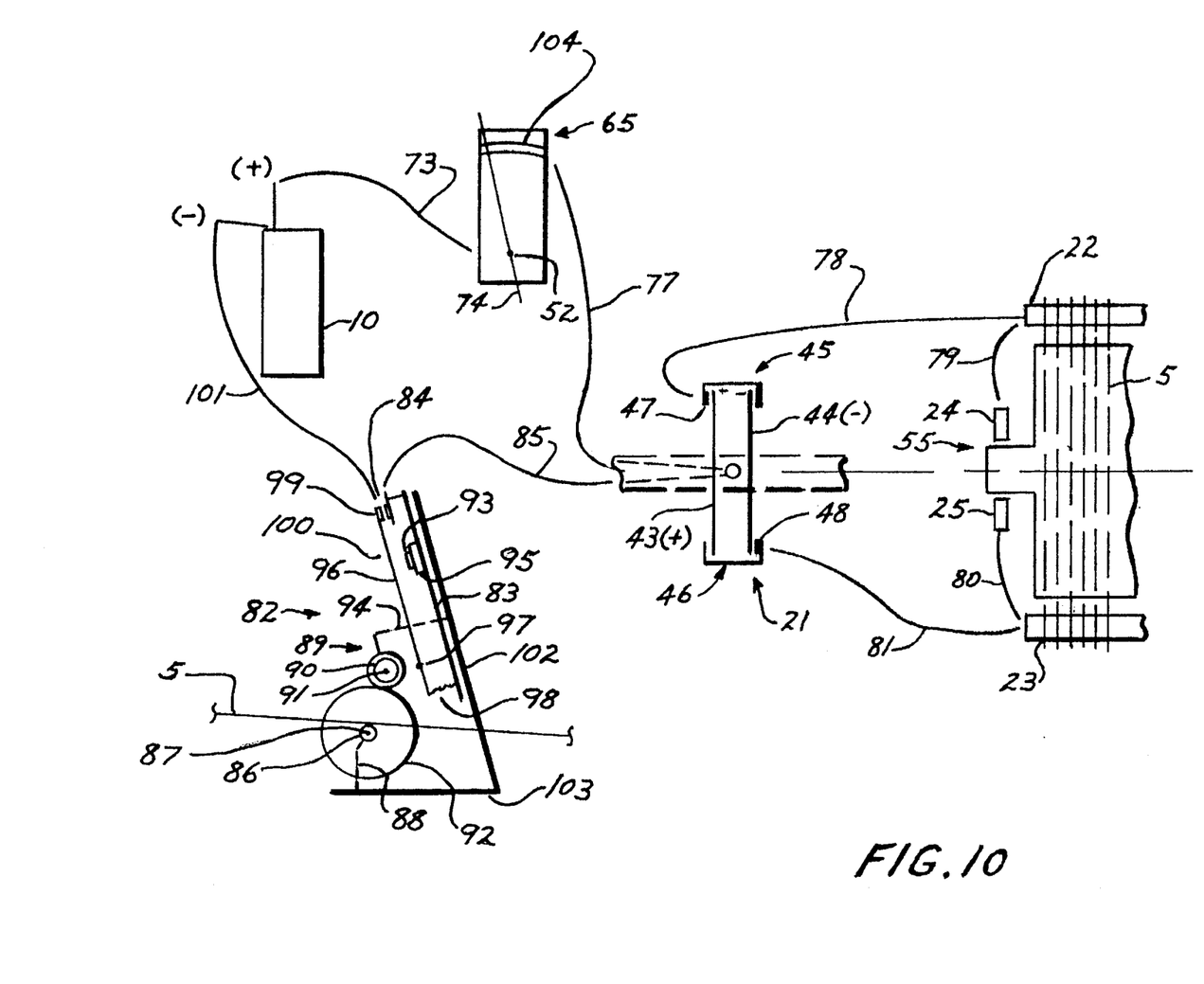
FIG. 10 is a schematic view of the inventions electrical circuit.

Finally, referring to FIG. 10, note the inventions electrical circuit plan and provide a wire 101 connecting the negative side of the battery 10, and the lever arm contact 99 of the on/off switch 82. Also provide a wire 85 connecting the base contact 84 of the on/off switch 82, and metal ring negative side contact 44. Also provide a wire 81 connecting right side shoe contact 48 and right side field coil 23. Also provide a wire 80 connecting field coil 23 and right side motor brush 25.

Continuing, provide a wire 79 connenting left side motor brush 24 and left side field coil 22. And provide a wire 78 connecting left side field coil 22, and left side shoe contact 47. And provide a wire 77 connecting metal ring positive side contact 43 and rheostat resistance winding 104. And also provide a wire 73 connecting rheostat post 52 and the battery's positive side. The rheostat 65 provided in the inventions electrical circuit is carried by bracket 75, shown in FIG. 1, to the bicycle frame 2. The rheostat adjusting lever 74 is in contact, variably ranging from non contact to actual contact, with the rheostat's resistance winding 104. Adjusting lever 74 is in direct contact with rheostat post 52. The electromagnetic relay, on/off switch 82 specified in the inventions electrical circuit, if available commercially need only provide actuation of the inventions electrical circuit to an on condition while the bicycle chain 5 is moved by pedalling. When pedalling stops, the circuit is off.

Suggested embodiment of the electromagnetic on/off switch 82 if it is not available commercially, would comprise the following. As shown in FIG. 10, provide a chain pulley 86 on a shaft 87 supported by bracket 88 to bicycle frame member 103. Provide a generator 89 with a small gear 90 mounted on its shaft 91. Provide a larger, step-up gear 92 mounted on the chain pulley shaft 87. The large gear 92 is enmeshed with the small gear 90 on the generator shaft 91. Provide an electro magnet 93 wired in circuit with the generator 89, and carried by bracket 95. Bracket 95 is supported to bracket 83. Provide a lever arm 96 that is made of soft iron. Mount the arm 96 on pivot 97. Adjacent pivot 97 provide a tension spring 98 connected between the arm 96, and bracket 83, to maintain counterclockwise pressure on the lever arm 96. Provide a contact 99 on the end of arm 96 that is opposite the spring 98. Spaced from contact 99 and supported to bracket 83, mount base contact 84 Above lever arm 96 fasten a stop pin 100. The stop pin 100 is provided to contain the travel of arm 96 in the counterclockwise direction. Position the location of the electromagnet 93 so that on excitation it attracts lever 96 and closes contacts 84 and 99, and provides on/off capability, in the inventions motor circuit, that is oriented to the riders pedalling of the chain 5. Support the on/off bracket 83, to 102, the near vertical bicycle frame member.

OPERATION OF THE INVENTION

This Electrically Assisted Pedalled Bicycle provides smoothly blended multiple source rotational torque to the hub of the bicycle's rear wheel. Basically, the riders pedalling rotates the bicycle chain and free-wheel sprocket. This produces rider oriented, or physical rotational torque. Secondarily, the pedalling rotates motor elements that are attached to the body of the freewheel, including, a motor's enclosure, frame, coils and brushes, about the motor' stationary commutator-armature unit.

During the rotational movement of these motor elements current is introduced in the electrical circuit of the motor. This produces motor oriented rotational torque. Both of these rotational torques flow smoothly through the freewheel body to the hub of the rear wheel. In unison, these multiple torques simultaneously propell the bicycle. When riding this electrically assisted bicycle, the flow of motor oriented torque to the hub can be varied to the point of elimination by manual control of the rheostat. The riders safety and the riders coordination are keyed to pedalling. All torque is eliminated when pedalling is stopped.

I claim:

1. An electrically assisted pedaled vehicle comprising:

a bicycle having frame, a seat, handlebars, a main sprocket, a pedal crank, pedals, a chain, and caliper brakes actuated by handlebar mounted hand levers;

a rear wheel having an elongated rear wheel axle having an end;

a freewheel body mounted on said rear wheel and including a larger diameter surface having grooves and a small diameter threaded surface;

a DC motor means comprising a commutator having a negative side and a positive side and an armature, said commutator and said armature affixed to said rear wheel axle;

a sprocket mounted on said larger diameter surface;

a stabilizing spacer ring mounted on said larger diameter surface for stabilizing said sprocket;

a circular motor base plate having a diameter;

a circular motor stabilizing ring having a diameter smaller than the diameter of said circular motor base plate, and a threaded center hole threadably engaged on said small diameter threaded surface of said body for stabilizing said motor base plate;

a brush arm ring comprising an outer surface, a threaded center hole threadably engaged on said small diameter threaded surface of said body, and two brush support arms projecting perpendicularly from said outer surface of said motor stabilizing ring, each said arm including a square shaped tubular motor brush holder having a carbon brush, a brush tension spring and a brush holder spring retaining cap, each said brush holder positioning a respective carbon brush in contact with each of said positive and negative sides of said DC motor commutator;

a brush arm stabilizing ring having a threaded center hole threadably engaged on said small diameter threaded surface of said body for stabilizing said brush arm ring;

a motor back plate journaled to said rear wheel axle by a brass flanged bearing located in a center of said motor back plate, a laminated motor frame comprising a pair of field coil windings including a negative side coil and a positive side coil, said laminated motor frame being supported on said motor base plate and said motor back plate by through bolts;

a motor enclosing cover having angle brackets fastened to said motor base plate and said back plate;

axle bracket means mounting said axle to said bicycle frame;

a battery supported by a battery holder mounted on said rear wheel axle, said battery holder stabilized by said axle bracket means; and manually controlled series circuit means for manually controlling electric current supplied by said battery to said DC motor.

2. The electrically assisted pedaled vehicle of claim 1, wherein said manually controlled series circuit means further comprises a manually operable rheostat mounted on said bicycle frame, said rheostat having an adjusting lever and a rheostat resistance winding for variably controlling said electric current.

3. The electrically assisted pedaled vehicle of claim 2, wherein said manually controlled series circuit means further comprises a circuit switch responsive to rotation of said chain by a rider's pedaling action, said circuit switch comprising a base contact, a secondary contact, a generator, a generator shaft gear for mounting a gear operably connected to said chain, and an electromagnetic switch, wherein current generated by said generator in response to rotation of said chain actuates said electromagnetic switch thereby closing said base and secondary contacts.

4. The electrically assisted pedalled vehicle of claim 3, wherein said manually controlled series circuit means further comprises:

a disk affixed to said rear wheel axle, said disk having a positive metal ring surface and a negative metal ring surface;

a pair of contact shoes, each mounted on a respective brush support arm and providing electrical contact with a respective one of said positive metal ring surface and said negative metal ring surface thereby operably interconnecting said rheostat resistance winding to positive side coil and operably interconnecting said circuit switch to said negative side coil.

5. The electrically assisted pedaled vehicle of claim 4, wherein said manually controlled saries circuit means further comprises an elongated wire access hole extending from said rear wheel axle end beyond said freewheel body to a vertical hole extending perpindicularly of said rear axle thereby providing wire access between said disk positive metal ring surfaces.

* * * * *